May 2, 1967     F. S. AJERO     3,316,933

LIQUID PROPORTIONAL MEASURING DEVICE

Filed April 27, 1964     2 Sheets-Sheet 1

INVENTOR.
FORTUNATO S. AJERO

BY Toulmin & Toulmin

ATTORNEYS

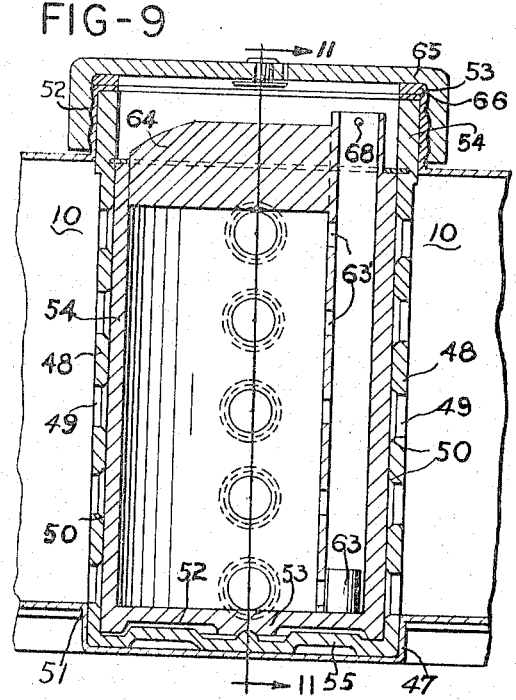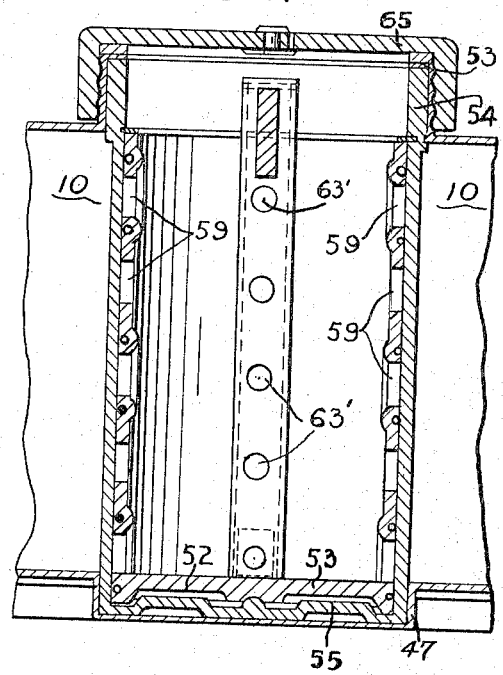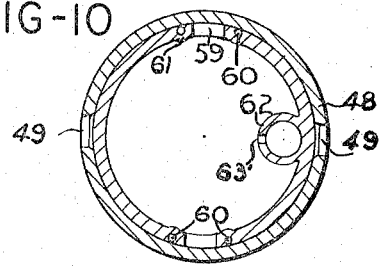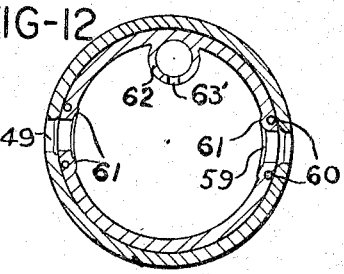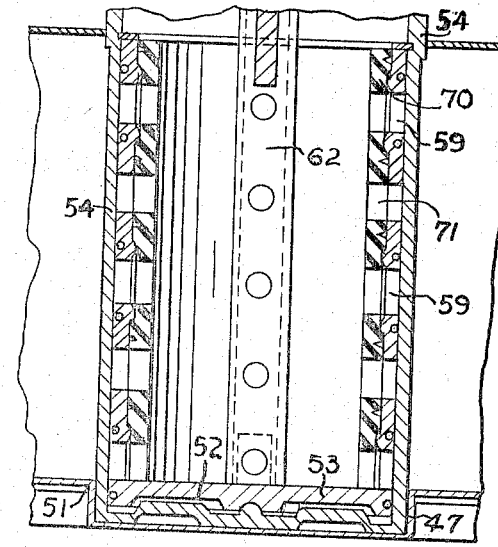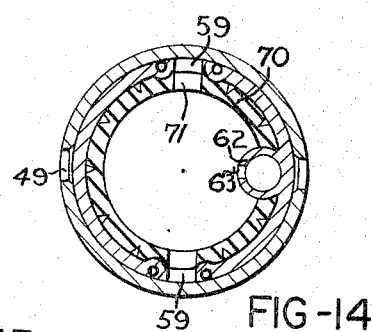

United States Patent Office 3,316,933
Patented May 2, 1967

3,316,933
LIQUID PROPORTIONAL MEASURING DEVICE
Fortunato S. Ajero, 2165 Broadway,
Springfield, Ohio 45504
Filed Apr. 27, 1964, Ser. No. 362,875
13 Claims. (Cl. 137—576)

The present invention relates to liquid measuring apparatus and more particularly to devices for proportioning quantities of different fluids according to the purpose of the mixture. For example, in the case of outboard motors used on boats, it is desirable to utilize gasoline and oil mixed in a predetermined proportion according to the specification of the engine manufacturer. Usually, in the case of a 2-cycle engine, the mix consists of 1 quart of oil to 6 gallons of gasoline. The proportion required by each type of engine is quite critical and may well determine whether the motor is hard to start, and whether it will perform at its optimum efficiency. The difficulty in obtaining an accurate mix lies in the fact that the operator tends, crudely, to guess at the required proportion, not having an accurate measuring device at hand, with the result the proper mixture for which the engine was designed to give its best performance is lacking.

Moreover, even when the proper portion of oil and gasoline has been achieved, perhaps through a laborious measuring procedure, the ingredients may not have been thoroughly mixed to provide uniform solution throughout, and this again might cause the engine to misfire or produce spotty operation. Various apparatus have been proposed heretofore to provide a mixture of fuel and lubricant. But some of this apparatus has had the fault of being unwieldy, heavy, and has readily detachable parts which are usually missing at the time the proportioner is to be used. Still others are of a complicated design and therefore expensive, in that they involve the use of a hand pump to squirt the oil into the gasoline. Some of the proportioners are not completely accurate in providing the proper mix even when care is taken during the measuring operation. The operator of an outboard motor is usually given the operating characteristics of the motor by the manufacturer including the precise optimum relative amounts of oil and fuel of a specified grade. This proportion never changes during the life of the motor assuming that the requisite grades of gasoline and oil are still being used.

Consequently, and in accordance with my invention, I provide a proportioning device made integral with the gas tank by the manufacturer as a permanent accessory in order to guarantee optimum mixing procedure. I have found that it is not necessary to provide a proportioner which may be adjusted (as distinguished from an abrupt structural change allowed for by the design) to meet all the proportional requirements of a number of different motors. Instead, it has been my experience that it is essential only to provide a single proportioning device forming part of the fuel tank of each motor and fix the amount of each ingredient by the geometrical and dimensional considerations of the various parts of the device which conditions and results are absolutely duplicative each time the proportioner is used. Thus, there can be no greater or less quantity of each ingredient than that which the optimum operating condition of the motor demands. The operation of the device therefore becomes "fool proof" and may be worked by one having little or no experience in mechanics or chemistry and always with the same results.

The primary object of the invention is to provide apparatus of an inexpensive and easily operable character which will accurately provide the proper proportioning of two liquids on a duplicative basis and for any use whatsoever.

Another object is to provide a proportioning device for liquids, especially oil and gasoline as a mixture for a 2-cycle outboard motor or motorcycle engine.

Still another object of the invention is to provide a mixture proportioning device which consists of a fixed installation on a fuel tank of an internal combustion engine and of which the relative proportions of mixed liquids are inexorably set by the geometrical shape and size of the parts of the device so as to obtain optimum duplicative results.

Another object is to provide an improved proportioning device for the fuel tank of an engine and in which not the slightest variations from the optimum requirements of the engine is permitted when the device is operated in its intended manner.

A further object is to provide a device of the character mentioned and in which the liquids forming the mixture are thoroughly mixed during the proportioning operation so as to obtain a mixture of uniform character through the mass.

Another object is to provide a two-liquid proportioning device for use in connection with 2-cycle outboard and motorcycle engines in which all of the operating parts are contained within the device and are inseparable therefrom.

Still another object is to provide a proportioning device for liquids in which, while the geometrical shape and size sets the specific proportions of the liquids to be mixed, these parameters can be changed in a simple and exact manner to provide other proportions brought about by the different shape and/or size of the modified device.

Other objects and features will be apparent as the specification is perused in connection with the accompanying drawings in which:

FIGURE 7 shows the improved proportioning device and part of the tank moved 90° from the position shown in FIGURE 2;

FIGURE 9 represents a fragmentary vertical sectional view of a modified form of the proportioning device;

FIGURE 10 represents a sectional view taken along line 10—10 in FIGURE 9 and looking in the direction of the arrows, but of smaller size than FIGURE 9;

FIGURE 11 is a fragmentary vertical sectional view of the modified device taken along line 11—11 in FIGURE 9, i.e., the device has been bodily moved 90° from the position assumed in FIGURE 9;

FIGURE 12 is a sectional view similar to FIGURE 10 except the interior parts have been rotated 90° to permit communication between the interior of the mixing container and the fuel tank whereas in FIGURE 10, the passageways between these members are shown in the closed position;

FIGURE 13 represents a vertical sectional view of still another form that the improved proportioning device may take, in changing the predetermined proportions of oil to gasoline. This view is taken with the interior parts of the apparatus (except as modified) in the same position as that shown in FIGURE 10; and FIGURE 14 depicts a sectional view showing the parts in the same position as in FIGURE 10 but directed to the modified structure of FIGURE 13.

Figure 3:
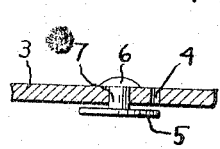
FIGURE 3 is an enlarged fragmentary view and in partial cross section to show the details of the small venting valve in the cap of the tank.
Figure 1:
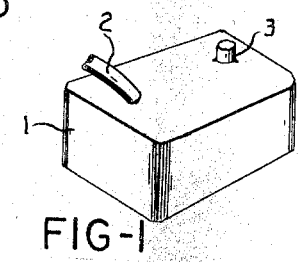
FIGURE 1 is a perspective view (in miniature) of the improved fluid proportioning device contained within and constituting part of the fuel tank of a gasoline engine (not shown)

In the small FIGURE 1, reference character 1 designates a fuel tank, preferably of rectangular shape, made of metal and preferably coated on the interior with a non-corrosive material. The tank is provided with a hose 2, made of metal which leads to the carburetor of a gasoline engine (not shown) for actuating an outboard motor or a motorcycle. An engine of this character may be of the 2-cycle type which requires a mixture of oil and gasoline of a predetermined weight, quality and octane rating. A typical form of engine may require one quart of oil for every six gallons of gasoline, both of a predetermined quality in order to obtain optimum results in the engine. In the event the mixture of oil and gasoline was not accurate and properly mixed, the engine might become hard to start, and perhaps sputter during operation because the mixture would not provide the proper source of power. It might cause engine failure. The oil and gasoline are poured through an opening at the top of the tank which is sealed by a cap 3. This cap is provided with a vent opening 4 (FIGURE 3) which may be opened and closed by a vertically movable metal disphragm 5, supported on a pin 6, which passes loosely through an opening in the cap and terminates in a rivet-shaped retaining member 7. The vent opening serves to assist in the suction effect of the engine exerted on the hose 2.

This invention is directed more particularly to obtaining the proper proportion between the oil and the gasoline that is contained in tank 1 to be used by a typical 2-cycle engine. Whereas an operator has crudely attempted to obtain the proper mix by measuring the gasoline and oil in separate measuring receptacles or cups and then combine them as they were being poured into the tank 1, the manipulation of the gasoline, usually of high octane character becomes hazardous, and more often than not, the operator would most likely not have at hand receptacles of the proper liquid content as to insure the correct proportion of the oil and gasoline. Moreover, in pouring the gasoline and oil separately into the tank there is the risk of spillage and also of failing to obtain a homogeneous mixture within the tank because the latter is usually attached to the stationary engine and there is no effective way of stirring the oil and gasoline after it has once been poured into the tank.

However, in accordance with the principles of my invention, I have devised a special and improved type of proportioner, which, by a simple manipulation of certain parts, actually the movement of a plug valve through 90°, the oil and the gasoline are combined in a homogeneous mixture without the necessity of stirring or other form of agitation and in which the predetermined proportions of oil and gasoline are absolutely assured.

Referring to FIGURES 2, 4, 5 and 8, the tank is designated by the reference character 1 of which the upper portions are formed, as far as possible, by a bending operation to eliminate joints. The bottom of the tank is closed by a heavy sheet metal member 8, which is provided at 9 with a recess of a partial circular shape. There is also a deeper recess or well designated at 10 which constitutes a support for a valve device identified generally at 11.

Within the tank and extending throughout the height thereof, there is a mixing container or chamber 12, of circular configuration, this container being supported at the bottom by entering the recess 9, and at the top is provided with a neck portion 13, extending through a top opening in the tank. The fill opening is reinforced by a heavy metal ring 14 provided with screw threads 15, and has a flange 16, which is welded to the tank around the periphery of the tank opening. The cap 3 is provided with an enlarged extension portion 17, having threads on the interior for being screwed into the ring member 14. The cap member is also provided with a shoulder at 18, for receiving a sealing ring 19, so when the cap 3 is screwed onto the ring or lip member 14 the joint at that position is completely air and liquid tight and the only opening to the atmosphere is obtained through the vent 4 referred to hereinbefore. In order to assure a complete liquid tight tank, the lower edge of the latter is secured preferably to the bottom plate 8 by a downwardly extending U shaped portion which receives the wall of the tank between the two adjacent legs, indicated generally at 20, and this joint may be welded or brazed if desired.

Figure 5:
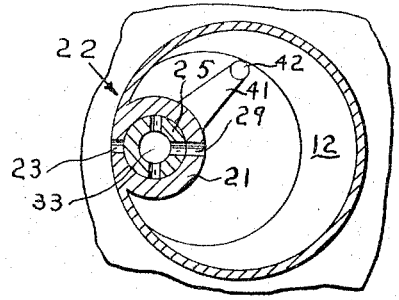
FIGURE 5 illustrates a horizontal section taken along line 5—5 in FIGURE 2 and looking in the direction of the arrows. This view shows the rotatable parts in a position as to close off the mixing container from the fuel tank.

The plug valve indicated generally at 11 is constituted of a hollow and tapered tubular member 21, vertically arranged and of a length greater than the interior height of the tank. The lower end of the member 21 extends into the circular recess 10 of the bottom tank plate for support and the upper portion of the member extends into and is supported by the surface of the ring element 14. As seen in FIGURE 5 the tapered member 21 constitutes part of the mixing chamber 12 to which it is integrally joined and thereby receives support from the structure of the container. There is a series of vertically aligned openings 23, extending substantially over the full height of the tubular member and thereby communicating with the interior of the tank 1. The tubular member is provided with internal screw threads indicated at 24 at the upper extending end.

Within the member 21 there is a tubular plug member 25, tapered similarly to the member 21 and is held above the bottom of this member by the tight fit between the plug and the outer cylinder 21 so as to leave a space 26. This plug member is provided with a shoulder 27 for receiving a ring-shaped nut 28 which upon being tightened holds the plug member 25 vertically in place and, if necessary, can take up the wear between the tapered surfaces. The space 26 at the bottom allows a certain amount of vertical adjustment between the plug member 25 and the tubular element 21. There is a vertical series of openings indicated at 29 in the tubular member 21 at the opposite side of the latter from the openings 23 but in horizontal alignment therewith. As in the case of the openings 23, these openings 29 extend for practically the full length of the tubular member. The plug element 25 is provided preferably, with three sets of vertically arranged openings, each line of openings being approximately 90° apart as seen more clearly in FIGURE 5 and extend substantially over the entire length of the plug member. These openings 29 communicate with the hollow interior of the plug member and their purpose will be explained hereinafter.

The upper end of the plug member 25 is provided with a stepped or shoulder portion 30 to leave a stem 31. This stem has a central opening 32 which is of smaller diameter than the longitudinal opening 33 in the plug so as to leave a shoulder 34. A pin 35 slidably reciprocates within the opening 32 and is provided with a head 36 which abuts the shoulder 34. The purpose of this pin will be explained hereinafter. The pin 35 is provided with a slot 37 which cooperates with a horizontally extending pin 38 which passes through the stem 31. The pin 38 has a head 39 resting in a counter-bored opening of a heavy metal ring 40 which is swingably movable about the stem 31 and rests on the shoulder 30 of the plug member. The slot 37 extends in a vertical direction so as to allow vertical movement of the pin 35, and also extends around the stem in order not to turn the pin when the ring and stem are rotated through 90°. There is a lever 41 attached integrally to the ring 40 and which terminates in a downwardly extending tip 42. The purpose of this lever and its tip will be explained during the operation of the device.

The bore 33 of the plug member 25 has the same diameter throughout so that the thickness of the plug 25 at the top is somewhat heavier than the thickness at the bottom. Within this bore, there is a hollow air filled shell of metal 43, preferably of cylindrical shape, but having rounded ends. This liquid-level indicator is of slightly smaller diameter than that of the bore 33 so as to freely move in the vertical direction, depending on the height of the liquid within the bore. As the level of the liquid continues to rise, the level indicator 43 will eventually come in contact with the head 36 of the pin 35 and push the pin upward.

In order to determine as to when the bore 33 is completely filled with liquid, or at least up to the predetermined level, I have provided a sighting member 44 represented by a metal lug secured to the upper surface of the ring 40. This lug may take any convenient shape, but as shown, is generally of a pie-shape in which the apex points toward the center of the pin 35. The thickness of the lug 44 or rather the level of its upper surface is such that when the end of the pin 35 is accurately in a horizontal line or level with the lug, the operator will know that the level of the liquid in the bore 33, as affecting the float member 43, is at the proper predetermined height.

Figure 6:
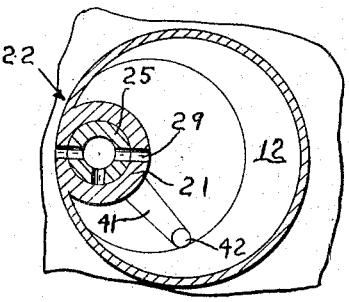
FIGURE 6 is a view similar to FIGURE 5 but showing the parts after they have been rotated to effect a passage between the mixing container and the tank.

The plug member 25 is provided with three vertical lines of openings 45. These lines are 90° apart, as seen more clearly in FIGURE 5, and are approximately of the same size as the openings 25 in the tubular member 21 and the openings 23 in the wall of the mixing chamber or container 12. The arrangement is such that all of these openings are in line with one another on each horizontal plane during the movement of the lever 41 at each end of its 90° travel. Thus, in FIGURE 5, the middle line of openings in the plug is shown in coincidence with the line of openings 29 and the solid wall of the plug is presented to the line of openings 23 of the mixing container. It will be noted that the lever 41 is at its uppermost position which is about 45° with respect to the horizontal reference line. But when the lever has moved through a 90° angle, as seen in FIGURE 6, so the lever is now 45° below the horizontal, a different line of openings 45 are in coincidence with the openings 29, and, in addition, a line of openings 45 come into coincidence with the line of openings 23 of the mixing chamber.

Figure 4:
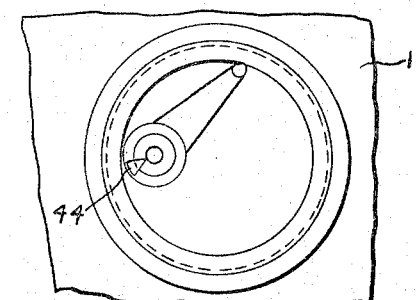
FIGURE 4 depicts the plan view of the improved proportioning device and showing part of the tank but with the cap removed therefrom in order more clearly to see the interior parts.
Figure 8:
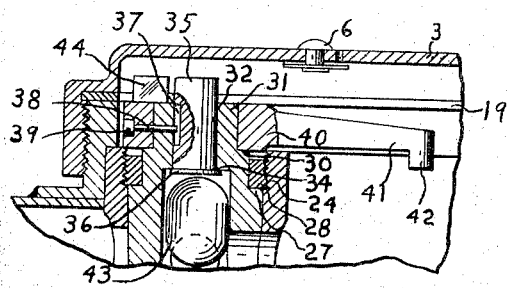
FIGURE 8 is an enlarged cross-sectional view of the upper portion of the structure shown in FIGURE 2.
Figure 2:
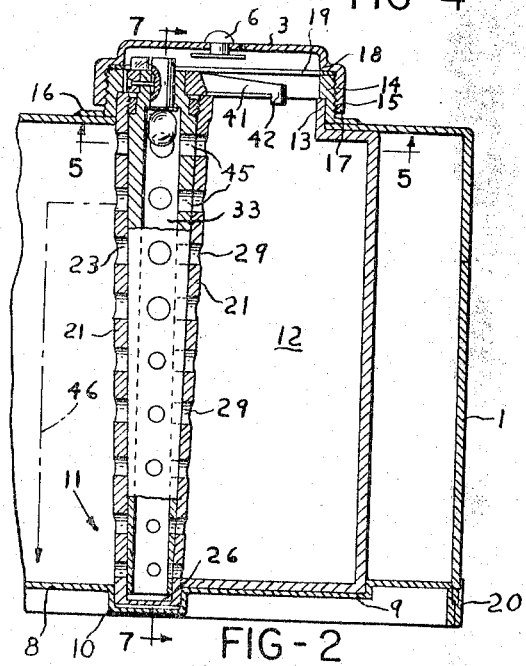
FIGURE 2 represents a fragmentary vertical sectional view of the proportioning device with the fuel tank broken away.
Figure 7:
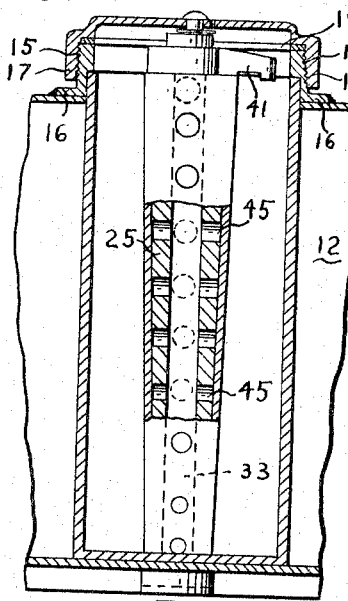
FIGURE 7 represents a fragmentary vertical sectional view taken along line 7—7 in FIGURE 2 and looking in the direction of the arrows. Thus

In order to insure that the lever 41 is moved precisely 90° to make certain the openings are brought into their respective coincident positions as explained, the length of the lever 41 and the position of its terminating tip 42 are such that in their upper positions, as shown in FIGURES 4 and 5, the tip 42 will bear against the interior surface of the ring 13, and due to the eccentricity of the center of the plug with respect to the center of the ring member, the lever or arm can swing in an arcuate manner to its lower position at which time the tip 42 will come in contact with another portion of the sleeve 18 and can be moved no farther. Thus the eccentricity of the center about which the lever swings with respect to the center of the ring member 13 will cause the various openings 23, 29, and 45 strictly to align themselves with one another along the horizontal planes in each of the two positions of the lever. As stated hereinbefore, strict coincidence in the vertical direction can be obtained by adjustment of the nut 28 which serves to move the plug 25 in a vertical direction, as well as to keep the tapered surface of the plug in liquid tight contact with the interior surface of the tubular member.

*Operation of the structure shown in FIGURES 2, 4, and 5 to 8*

The purpose of the invention is to provide a practical structure and method of proportioning gasoline with its proper oil content as a homogeneous mix, especially designed for 2-cycle engines that require these mixtures for optimum starting and operating performance. This proportion, according to my invention, is obtained on the basis of providing the proper proportion between the oil receiving spaces within the apparatus with respect to the gasoline receiving spaces including the interior of the fuel tank. This will be made clear when the operation of the mechanical parts are described.

The first procedure is to loosen and remove the cap 3 from the tank. This operation will expose the hand lever 41 and the latter is moved upwardly in the counter-clockwise direction as shown in FIGURES 4 and 5 until the tip 42 makes contact with the interior surface of the ring member 13. In this position, the middle line of openings 45 are brought into coincidence with the single line of openings 29 of the tubular member and the two outer lines of openings 45 are closed against the wall of the tubular member. The line of openings 23 leading into the tank are also closed by the wall of the tubular member. Oil of the right weight and quality is now poured into the opening formed by the lip 13, past the lever 41, and as seen in FIGURE 5, this oil is free to move through the openings 29 and the middle line of openings 45 into the interior 33 of the plug. As the pouring continues, the float lever 43 will rise vertically until it strikes the head 36 of the pin 35, carrying the pin upwardly. When the end surface of the pin is in line with the upper surface of the lug 44 as sighted by the operator, the oil will have reached the predetermined level within the tubular member 12 and within the plug valve. If desired, the sighting surfaces of the lug and the end of the pin can be coated with a material that can be readily seen by the operator to make the level indicating as accurate as possible.

Assuming the oil has reached the proper height in the manner stated, the next step is to swing the lever 41 through a 90° angle until the tip 42 strikes the other side of the lip 13 as shown in FIGURE 6. In this case, one line of openings 45 of the plug will coincide or communicate with the openings 23 of the container. Another line of openings 45 will communicate with the openings 29 of the tubular member. Under these circumstances the oil will run out or drain through the open apertures 45 and the openings 23 and 29 into the tank 1.

As soon as the last drop of oil has drained out and the float 43 has moved downward to its lowest level, gasoline of the proper octane rating and quality is then poured through the neck opening 13 and this gasoline will flow readily through the openings 23 and 29 and 45 into the interior 33 of the plug as can readily be visualized in FIGURE 6. As the liquid level in the interior rises the float 43 will again rise and when the float strikes the pin-head 36 and the upper surface of the pin 35 is on the same level as the upper surface of the lug 44 the pouring is stopped, and the cap 3 is immediately applied. It will be noted that as the level of the gasoline within the plug rises there is a flow of fluid into and out of the openings 23, 29, and 45 and the dropping of the gasoline onto the oil tends to stir the latter and causes it to mix homogeneously with the gasoline.

This circulatory mixing effect is also enhanced by the fact that the column of gasoline within the container 12 rises momentarily above the level of gasoline in the tank and this difference in level of gasoline inside and outside the container causes a momentary rush of the liquid through the opening 23. This dropping effect of the fluid, indicated by the dot-dash line 46 in FIGURE 2, causes a further mixing of the gasoline with the previously introduced oil. However, it will be understood that this gasoline will not drop by gravity from these various openings 23 when the parts are in the so-called "closed" position of FIGURE 2.

After the engine has used up all of the gasoline and oil in the tank, the cap is then unscrewed, and the lever 41 is returned to its initial upper position of FIGURES , 4 and 5 which again will cause the openings 23 to be losed by the wall of the plug (see FIGURE 5) when the penings 29 will remain in coincidence with the middle et of openings 45 of the plug and the float 43 will be lown at the bottom of the central opening 33 in the lug, ready for the next initial charge of oil.

As stated hereinbefore the optimum proportion of a typical 2-cycle outboard or motorcycle engine between the gasoline and oil assuming the proper grades of each is 24 parts gasoline to one part of oil. The apparatus automatically maintains this proportion by making the volumetric space within the confines of the mixing chamber 12 and the single line of openings 29 in the tubular member 21, also one line of openings 45 in the plug 25 and the space within the bore 33 bear a 1 to 24 relation with the volumetric space within the tank 1, the mixing chamber 12, the line of openings 23, also the single line of openings 29, and two oppositely disposed lines of openings 45 together with the opening 33 in the plug as seen in FIGURE 6. This geometric and volumetric relation always remain constant and the attainment of this 1 to 24 volumetric relation is obtained simply by moving the lever 41 from the position shown in FIGURES 4 and 5 to the position shown in FIGURE 6. There is, obviously, no wear on the few moving parts of the device since the movement of the lever 41 is quite limited (90°) and is occasioned only when the tank needs a refilling of the oil and gasoline mixture. Moreover, all of the parts remain intact within the apparatus so the latter constitutes an integral whole and is self contained. The only adjustment that may be needed is to adjust the ring nut 28 for tightening the plug within its outer shell 21. The large number or multiplicity of the openings in the plug, the tubular member surrounding the plug and the mixing chamber facilitate the free flow of the charged oil, and then, the filling with gasoline in their proper and immutable proportions.

A modified form of the proportioning device is shown in FIGURES 9 to 12, inclusive. In general, the structure there illustrated employs a relatively large cylinder which performs the function of a plug and within this cylinder there is a separate tube structure for receiving the auxiliary column of oil and gasoline in which the float operates. Referring to these figures the tank is indicated at 1 and the bottom of the tank is provided with a relatively large downwardly extending recess 47 into which is tightly fitted an upwardly extending cylinder 48 that constitutes the mixing container. As shown in FIGURE 10, this mixing container has a vertical line of openings 49 at each side thereof which are preferably chamfered as indicated at 50 around their inner edge. The purpose of these openings will be explained hereinafter. The bottom 47 of the tank is provided with a crimped joint 51, soldered or welded to the side of the tank. The upper end of the tank is provided with an opening formed of a threaded lip 52 which has an overhanging or flange portion 53 conforming to the tank opening. The upper end of the container 48 is provided with a slightly thicker terminating portion 54 which fits snugly within the threaded lip 52 of the tank. This portion abuts the flange 53 of the tank. The lower portion of the container 48 is provided with an upwardly extending recessed portion 55, annular in shape, and a centrally located button member 56.

Within the container 48 there is a cylindrical member 57 which acts as a pseudo plug and fits snugly but slidably within the container 48. This plug member extends approximately as far as the upper surface of the tank and abuts a metal retaining ring 58 which fits within a peripheral slot contained within the terminating portion 54 of the container 48. At positions similar to those formed in the container 48 there are two lines of openings 59 diametrically disposed with respect to one another, as seen more clearly in FIGURE 12, these openings being coincident with one another when the valve is in "open" position as will be explained presently.

There are sealing rings 60 located on each side of the openings 59, and if desired, the metal in the region of these rings can be made heavier as indicated at 61. Extending inwardly from the plug 57 at a position midway between the opening 59, there is a semi-circular column of metal indicated at 62 having a hollow interior which receives the float member 63. This extension 62, at the innermost position, is provided with a vertical line of openings 63', as many as there are openings 49 and 59, and all on the same level, so that as the plug 57 is swung through a 90° angle, some of these openings will coincide and when swung back to its initial position, other openings will coincide with one another, as will be explained hereinafter. In order to turn the valve with respect to the container 48, I provide a bar or bridge 64 which may be welded or otherwise secured to the innermost surface of the extension 62 at one end and at the other end is welded or otherwise secured to the inside surface of the sleeve plug, as seen more clearly in FIGURE 9.

A screw cap 65 having threads on its interior surface is provided for engaging the threads 52 on the tank and a rubber seal 66 is contained within the cap so as to clamp tightly down to the upper surface of the tank flange 53. There is a vent device in the cap, indicated at 67, and of substantially the same construction as was described in connection with FIGURE 3. It is intended that the bridge member 64 shall be rotated carrying with it the sleeve-like plug 57 through only 90° and for this purpose the lip 54 of the container 48 is provided with a pair of suitably positioned lug members (not shown) extending inwardly so as to contact the bridge member when moving from one of its extreme positions to the other position and vice versa.

The operation of the apparatus shown in FIGURES 9 to 12 is in many respects similar to that which was explained on connection with FIGURES 2 and 4 to 8. The cap is first removed and oil is poured within the inner sleeve plug 57, the bridge member taking the position in which the two sets of openings 49 are closed by the wall of the plug, as seen in FIGURE 10. As the oil is poured into the plug, it will flow through the openings 63' into the interior of the extension 62. The float 63 will then move progressively upwardly until as the oil is continued to be poured the float strikes pin 68. Upon striking this pin the operator will then stop pouring the oil. The bridge bar 64 will then be moved 90° carrying with it the sleeve plug 57 and the latter assumes the position shown in FIGURE 12 in which the openings 59 at each side of the sleeve plug coincide with the openings 49 of the mixing chamber or container. The oil within the plug 57 will then run through the aligned openings 49 and 59 into the tank 1.

With the sleeve plug still in the same position gasoline is now poured through the neck 54 into the plug and it will pass freely through the openings 49, 59, some of this gasoline dropping through the short vertical distance to mix with the oil that has been previously deposited in the tank. The float 63 will have moved down to its lowermost position immediately after the oil had all drained out. But upon having received the charge of gasoline starts to rise due to the entrance of the gasoline through the openings 63'. When the float again strikes the pin 68 no further gasoline is poured. The cap 65 can then be screwed on the top of the tank.

As in the case of the previous figures described, the proportioning function is obtained by the combined volumetric spaces within the confines of the container or chamber 48 and of the sleeve plug and interior of the extension 62 as compared with the volumetric space within the tank, the mixing chamber, the sleeve plug and the float containing extension 62. These relative volumetric spaces never change and in the event of a typical engine that uses an oil to gasoline relation of 1 to 24 (1 quart of oil to 6 gallons of gasoline), the volumetric space present when the valve is in a so-called "closed" position as when pouring in the oil, i.e., as shown in FIGURES 10 and 14, represents 1/24 of the volumetric space within the parts when they assume the "open" valve position of FIGURE 12. These volumetric spaces are carefully calculated by the manufacturer of the proportioning device, which usually is the engine manufacturer, to give optimum results in the operation of the engine depending on the number of cycles of the engine, and the use to which the engine is to be put. All the parts are integral, i.e., non-detachable from one another, so the structure as a whole is self-contained and the only operation necessary is the movement of the bridge from one limit position to the other to open and close the valves and the visual operation of noting as to when the float strikes the pin 68 during the oil pouring and the gasoline pouring operation.

It might be that the manufacturer has a call for a proportioning device that requires a different quantity relation between the oil and the gasoline than that explained by way of example hereinbefore. Even though the structure had been previously designed for a 1 to 24 space relationship, this proportion can be readily changed, but not on an adjustment basis but by an abrupt and more accurate change in the relative spaces. For example, a liner 70 having suitable openings 71 (FIGURES 13 and 14) may be inserted within the sleeve plug. This liner may be made of any suitable plastic material such as polyurethane foam, and if desired, may be held in place by small inwardly projecting spikes which are distributed over the interior surface of the sleeve plug, these spikes being adapted to be pressed into the liner 70. The liner is preferably of the same height as the height of the sleeve plug and its thickness is so predetermined as to change the space within the plug in such a way as to give the desired relative volumetric sizes when the device is used for receiving oil, and later for receiving gasoline. It is obvious that the liner 70 can take on various predetermined thicknesses as determined by the manufacturer or the operator to give any predetermined relative volumetric spaces by which properly to proportion the oil and gasoline.

From the foregoing, it is evident that I have disclosed a practical device for obtaining optimum proportion between oil and gasoline of a predetermined grade for guaranteeing the best performance of a 2-cycle engine. The invention is based on the use of two measuring spaces of fixed proportioned sizes including that of the fuel tank and in which a structure of a particular character effects the change-over from one space to the other during the mixing operation by the simple turn of a handle or lever. The character of the structure and its operation is such that the sufficient turbulence is set up within the mix being produced to obtain a homogeneous body of oil and gasoline. The homogeneity of the mixture is highly desirable in effecting an efficient engine performance of an easy start and smooth operation of a continuous character.

An important aspect of my invention is the fact that the improved device presents the same proportional areas at any horizontal plane from the bottom to the top of the device when the plug is moved from one position to the other. Consequently, it is unnecessary to know beforehand the amount of fuel mixture left in the tank when replenishing the same because any added mixture will always bear the required proportion of oil and gasoline regardless of the level of the remanent mixture.

While my improved apparatus is based on the inexorableness of the use of two fixed volumetric spaces by which the fluids are proportioned provision is made for radical changes in the proportion of oil and gasoline depending upon the use, by adding liners of fixed volume in the spaces. These liners can be marked as to the change in proportion they provide when used in a given mixing apparatus so that a series of different liners will furnish any and all changes in the proportions of the oil and gasoline that may be required for any type of engine. The use of the liners in no way interferes with the speed and accuracy with which the change-over from the oil space to the gasoline space is effected.

It will be understood that this invention is susceptible to modification in order to adapt it to different usages and conditions and accordingly, it is desired to comprehend such modifications within this invention as may fall within the scope of the appended claims.

I claim:

1. In combination a fuel tank and a self-contained proportional mixing chamber therein, normally sealed from the tank except for openings in the wall of the chamber leading into the tank, a cylinder formed integral with said wall at the position of said openings and extending inwardly of said chamber, the innermost portion of said member having openings which are in line with the openings in the wall of the chamber but positioned remote therefrom, a rotatable circular valve within the cylinder means having openings therethrough, said valve having a first position with said openings coincident with the openings in the wall of said chamber and with the openings in the cylinder member in order to allow free flow of fluid from the mixing chamber into the tank when the valve is in said first position, said valve being adapted to be moved to a second position which serves to close the communication between said chamber and the tank.

2. In combination a fuel tank and a self-contained proportional mixing chamber therein, normally sealed from the tank except for openings in the wall of the chamber leading into the tank, a cylinder formed integral with said wall at the position of said openings and extending inwardly of said chamber, the innermost portion of said member having openings which are in line with the openings in the wall of the chamber but positioned remote therefrom, a rotatable circular valve within the cylinder member having openings therethrough, said valve having a first position with said openings coincident with the openings in the wall of said chamber and the openings in the cylinder member in order to allow free flow of fluid from the mixing chamber into the tank when the valve is in said first position which serves to close the communication between said chamber and the tank, the volumetric space within the confines of the mixing chamber and within the valve, bearing a predetermined relation to the volumetric space contained within the tank, the mixing chamber and the valve.

3. In combination, a fuel tank and a self-contained proportional mixing chamber within the tank for adding oil to the fuel within the tank, said chamber being sealed from the tank except for openings extending through the wall of the chamber, and means interposed between the tank and said chamber including a valve having openings therethrough coincident with those in the wall of the chamber when the valve is in a first predetermined position to provide communication between the tank and the chamber, said valve being movable to a second predetermined position in which its openings do not register with said openings through the wall of the chamber whereby to prevent communication between the tank and said chamber, and means for selectively positioning the valve in said first position or said second position, the ratio of the volume included in the mixing chamber to the volume included within the tank and mixing chamber being equal to the ratio between the volume of oil to the volume of gasoline predetermined as suitable fuel for an engine.

4. Apparatus for providing the optimum proportion between gasoline and oil for a 2-cycle outboard or motorcycle engine, said apparatus including a gasoline tank and a self-contained proportional mixing chamber for receiving oil and positioned within the tank, said chamber being sealed from the tank except for openings extending through the wall of the chamber, and means including a plug valve interposed between the tank and said chamber and having openings coincident with those within the wall of the chamber when the plug valve is in a first position to permit the oil in said chamber freely to flow and mix with the gasoline in the tank, said plug valve being adapted to be moved to a second predetermined position in which its openings are out of coincidence with those in the mixing chamber whereby the oil content in the chamber is temporarily prevented from reaching the gasoline tank, and means for moving the plug valve from the second predetermined position to said first predetermined position to allow free passage of the fluid from the mixing chamber to the tank, said plug valve being hollow and the interior being accessible through the openings therein whereby oil is permitted to flow into the interior of the plug valve before being released into the tank when the openings therein are brought into coincidence with those in the wall of the chamber, and a float contained within the hollow plug valve and adapted to float upwardly as the oil in the valve continues to rise whereby the position of the float within the plug valve serves as an indicator as to the level of the liquid in the mixing chamber.

5. Apparatus for providing the optimum proportion between gasoline and oil for a 2-cycle outboard or motorcycle engine, said apparatus including a gasoline tank and a self-contained proportional mixing chamber for receiving oil and positioned within the tank, said chamber being sealed from the tank except for openings extending through the wall of the chamber and means including a plug valve interposed between the tank and said chamber and having openings coincident with those within the wall of the chamber when the plug valve is in a predetermined position to permit the oil in said chamber freely to flow and mix with the gasoline in the tank, said plug valve being adapted to be moved to cause its openings to shift out of coincidence with those in the mixing chamber whereby the oil content in the chamber is temporarily prevented from reaching the gasoline tank, and means for moving the plug valve from the position in which the communicating openings between the tank and the chamber are closed to a second position in which the openings are brought into alignment with one another to allow passage of the fluid from the mixing chamber to the tank, said plug valve being hollow and the interior being accessible through the openings therein whereby oil is permitted to flow into the interior of the plug valve from the oil chamber when the said openings in the valve and those in the chamber are brought into coincidence with one another, and a float contained within the hollow plug valve adapted to float upwardly as the oil in the valve continues to rise whereby the position of the float within the plug valve serves as an indicator as to the level of the liquid in the mixing chamber, the volumetric space within the mixing chamber and within the plug valve but excluding the float bearing a predetermined relation to the volumetric space contained within the tank, the mixing chamber and the plug valve.

6. In combination, a fuel tank for receiving gasoline and a proportional mixing container within the tank and extending over the full height of the tank so as to be self-contained and adapted to receive a charge of oil, said container being provided with a fill-opening and with openings in vertical alignment along the wall thereof, a tubular member being integral with said wall at the position of said openings and extending inwardly toward the center of the container, said tubular member being of substantially the same height as the length of the container and having a fill-opening in common with that of the tank and the container, said tubular member having openings in vertical alignment which are positioned diametrically opposite from the openings in the container wall but in horizontal alignment respectively therewith, a cylindrical plug rotatably movable within said tubular member, said plug being provided with transversely extending openings which in one position of the plug coincide with the openings in the tubular member and the openings in the wall of the container, but when rotated through a predetermined angle, the openings in the plug are caused to move out of coincidence with the openings in the wall of the container whereby said plug obstructs the passageway between the mixing container and the tank, means for rotating the plug to a predetermined position by which the passageway from the container to the tank is obstructed while the lubricant is being poured into said container through its fill opening, said means also being adapted to move the plug to a second position in which the oil contained within the mixing container is caused to flow through the openings in the plug and container into the fuel tank.

7. In combination, a fuel tank for receiving gasoline and a proportional mixing container within the tank and extending over the full height of the tank so as to be self-contained for receiving oil, said container having a fill-opening, the wall of the container having openings in vertical alignment and which extend substantially over the entire height of the wall, a tubular member integral with the wall at the position of said openings, and extending inwardly toward the center of the container, said tubular member extending the full height of the container and having a fill-opening in common with that of the container, said tubular member being provided with openings in vertical alignment and extending over substantially the entire height of said member, said last mentioned openings being positioned diametrically opposite from the openings in the container wall but in horizontal alignment respectively therewith, a cylindrical plug rotatably movable within said tubular member, said plug being hollow and provided with transversely extending openings along substantially the entire height of the plug, which in one position of the plug, coincide with the openings in the tubular member and the openings in the wall of the container, said plug having a second position in which the openings in the plug are out of coincidence with the openings in the wall of the container whereby the wall of the plug obstructs passage between the mixing container and the tank, means for rotating the plug from the first to the second position and vice versa to bring the interior thereof alternately into communication with the mixing container and then into communication with each of the mixing container and the interior of the tank.

8. In combination, a fuel tank for receiving gasoline and a proportional mixing container within the tank and extending over the full height of the tank so as to be self-contained for receiving oil, said container having a fill-opening, the wall of the container being provided with openings in vertical alignment which extend substantially over the entire height of the wall, a tubular member integral with the wall at the position of said openings and extending inwardly toward the center of the container, said tubular member extending the full height of the container and having a fill-opening in common with that of the container, said tubular member being provided with openings in vertical alignment and extending over substantially the entire height of said member, said last mentioned openings being positioned diametrically opposite from the openings in the container wall but respectively in horizontal alignment therewith, a cylindrical plug rotatably movable within said tubular member, said plug being hollow and provided with transversely extending openings along substantially the entire height of the plug, which in one position of the plug, coincide with the openings in the tubular member and the openings in the wall of the container and which when rotated to a second position are out of coincidence with the openings in the tubular member and in the wall of the container whereby the wall of the plug obstructs a passageway between the mixing container and the interior of the tank, and means for rotating the plug from the first to the second position and vice versa, in order to bring the interior thereof alternately into communication with the mixing container and then into communication with each of the mixing container and the interior of the tank, and a float contained within the hollow plug in order to determine the height of the oil within the mixing container in one position of the plug and to determine the height of the oil and gasoline mixture in the tank in the other position of the plug.

9. In combination, a fuel tank and a mixing proportioner in the tank for combining oil and gasoline, said proportioner including a valve and a surrounding container, said valve being constituted of a hollow plug fitted within a tubular member, and adapted to be turned therein from a first to a second position, openings in said plug and tubular member and also in said container adapter to coincide with one another in said first position of the plug, said plug, in the first position, serving to communicate with the interior of the container through the openings in the plug and tubular member but maintaining the openings in the container closed, and upon being rotated to the second position of the plug, serving to maintain the interior of the plug in communication through said openings with said container and also with said tank, the total volumetric capacity of the mixing proportioner having a predetermined ratio to the total volumetric capacity of the fuel tank and mixing proportioner.

10. In combination, a fuel tank and a mixing proportioner in the tank for combining oil and gasoline, said proportioner including a valve and a surrounding container, said valve being constituted of a hollow plug fitted within a tubular member and adapted to be turned therein from a first to a second position, openings in said plug and tubular member and also in said container adapted to coincide with one another in said first position of the plug, said plug, in the first position, serving to communicate with the interior of the container through the openings in the plug and tubular member but maintaining the openings in the container closed, and upon being rotated to the second position of the plug, serving to maintain the interior of the plug in communication through said openings with said container and also with said tank, the total volumetric capacity of the mixing proportioner having a predetermined ratio to the total volumetric capacity of the fuel tank and mixing proportioner and a liner of predetermined thickness insertable within the container for changing the predetermined space relation to a different predetermined relation.

11. In combination, a fuel tank and a mixing proportioner in the tank for combining oil and gasoline, said proportioner including a valve and a surrounding container, said valve being constituted of a hollow plug fitted within a tubular member, and adapted to be turned therein from a first to a second position, openings in said plug and tubular member and also in said container adapted to coincide with one another in said first position of the plug, said plug in the first position, serving to communicate with the interior of the container through the openings in the plug and tubular member but maintaining the openings in the container closed, and upon being rotated to the second position of the plug, serving to maintain the interior of the plug in communication through said openings with said container and also with said tank, the total volumetric capacity of the mixing proportioner having a predetermined ratio to the total volumetric capacity of the fuel tank and mixing proportioner and a liner of predetermined thickness insertable within the container for changing the predetermined space relation to a different predetermined relation, and a float member structurally associated within the hollow plug.

12. In combination, a fuel tank, and a device for producing a mixture of oil and gasoline within the tank, said device including a container having communicating openings between the tank and container, and means including a plug valve adapted to be rotated within the container for allowing access to the container for a predetermined quantity of oil and for causing the openings between the container and tank to be closed, said plug valve, upon being rotated being adapted to serve as a means for causing openings between the container and tank to be opened to allow the oil to escape into the tank, and means for determining a measured quantity of gasoline to be received by the tank for mixing with the oil therein, said predeterminned quantities of oil and gasoline being measured by a level responsive device structurally associated with the plug valve.

13. In combination, a fuel tank, and a proportioning device therein for mixing oil and gasoline in a predetermined proportion, said device including a vertical container within the tank and a hollow vertical plug fitted rotatably within a vertical tubular member and adapted to be turned between two positions, said plug and tubular member being contained within said container, said plug having three lines of openings extending along the height of the plug and spaced approximately 90° apart, said openings leading to the hollow interior of the plug, said tubular member and container each having a single line of openings extending along the height thereof, said openings being all spaced the same distance apart in the respective plug, tubular member and container to coincide with one another when the plug is in one of its two positions, and means for rotating the plug from one position to the other position to cause the interior of the container to be in communication with the interior of the plug through some of said openings, and when moved to a second position to cause the interior of the tank to be in communication with the interior of the container and the plug through some of said openings, the volumetric space presented to the oil when the plug is in one of its two positions being proportional to the space presented to the gasoline when the plug is in the other of its two positions.

References Cited by the Examiner

UNITED STATES PATENTS

| 1,874,060 | 8/1932 | Pettit | 222—133 |
| 2,788,801 | 4/1957 | Mowat | 137—576 |
| 2,986,162 | 5/1961 | Spexarth | 137—571 |
| 3,100,000 | 8/1963 | Cook | 137—571 |

M. CARY NELSON, *Primary Examiner.*

W. R. CLINE, *Assistant Examiner.*